United States Patent
Redaelli

(10) Patent No.: US 10,817,363 B2
(45) Date of Patent: Oct. 27, 2020

(54) HEALTH CHARACTERISTICS OF A MEMORY DEVICE

(71) Applicant: Micron Technology, Inc., Boise, ID (US)

(72) Inventor: Marco Redaelli, Munich (DE)

(73) Assignee: Micron Technology, Inc., Boise, ID (US)

(*) Notice: Subject to any disclaimer, the term of this patent is extended or adjusted under 35 U.S.C. 154(b) by 205 days.

(21) Appl. No.: 16/007,191

(22) Filed: Jun. 13, 2018

(65) Prior Publication Data
US 2019/0286505 A1  Sep. 19, 2019

Related U.S. Application Data

(60) Provisional application No. 62/644,925, filed on Mar. 19, 2018.

(51) Int. Cl.
*G06F 11/00* (2006.01)
*G06F 11/07* (2006.01)

(52) U.S. Cl.
CPC .......... *G06F 11/079* (2013.01); *G06F 11/073* (2013.01); *G06F 11/076* (2013.01)

(58) Field of Classification Search
CPC ... G06F 2219/24198; G06F 2211/1097; G06F 11/2289; G06F 11/0739; G06F 11/1417; G06F 9/4408; G06F 9/441
See application file for complete search history.

(56) References Cited

U.S. PATENT DOCUMENTS

| | | | |
|---|---|---|---|
| 9,411,537 B2 | 8/2016 | Kim et al. | |
| 9,626,112 B2 | 4/2017 | Adam | |
| 2004/0153846 A1* | 8/2004 | Lee | G06F 11/1417 714/42 |
| 2008/0168310 A1* | 7/2008 | Saretto | G06F 11/2284 714/30 |
| 2012/0233401 A1 | 9/2012 | Liu et al. | |
| 2013/0036300 A1* | 2/2013 | Baik | G06F 9/4401 713/2 |
| 2014/0082250 A1 | 3/2014 | Yoo et al. | |
| 2014/0082267 A1 | 3/2014 | Yoo et al. | |
| 2014/0082404 A1 | 3/2014 | Kang et al. | |
| 2014/0181495 A1* | 6/2014 | Jang | G06F 11/2284 713/2 |

(Continued)

OTHER PUBLICATIONS

International Search Report and Written Opinion from related international application No. PCT/US2019/022403, dated Jul. 2, 2019, 13 pages.

*Primary Examiner* — Christopher S McCarthy
(74) *Attorney, Agent, or Firm* — Brooks, Cameron & Huebsch, PLLC

(57) ABSTRACT

An example apparatus includes a first memory and a second memory coupled to the first memory. A controller may be coupled to the first memory and the second memory. The controller may be configured to cause the apparatus to be initialized by executing instructions on the first memory device. Initializing the apparatus may include operating the apparatus according to a set of semantics different than a set of semantics used by the second memory device. The controller may be configured to cause a determination regarding at least one health characteristic of the second memory to be made subsequent to the apparatus being initialized.

23 Claims, 2 Drawing Sheets

(56) References Cited

U.S. PATENT DOCUMENTS

| | | |
|---|---|---|
| 2014/0208026 A1 | 7/2014 | Gibbons et al. |
| 2016/0191815 A1* | 6/2016 | Annau .................. H04N 13/111 348/38 |
| 2017/0123809 A1* | 5/2017 | Chisholm ............... G06F 11/14 |
| 2017/0153836 A1 | 6/2017 | Kim |
| 2018/0101388 A1* | 4/2018 | Hummel ................... G06F 8/65 |
| 2018/0173536 A1* | 6/2018 | Sela ........................ G06F 9/441 |

* cited by examiner

HEALTH CHARACTERISTICS OF A MEMORY DEVICE

PRIORITY INFORMATION

This application claims benefit of U.S. Provisional Application No. 62/644,925 filed Mar. 19, 2018, the specification of which is incorporated herein by reference.

TECHNICAL FIELD

The present disclosure relates generally to semiconductor memory and methods, and more particularly, to apparatuses and methods related to health characteristics of a memory device.

BACKGROUND

Memory devices are typically provided as internal, semiconductor, integrated circuits in computing systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processing resource can comprise a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., inversion) logical operations on data (e.g., one or more operands). For example, functional unit circuitry may be used to perform arithmetic operations such as addition, subtraction, multiplication, and division on operands via a number of logical operations.

A number of components in a computing system may be involved in providing instructions to the functional unit circuitry for execution. The instructions may be executed, for instance, by a processing resource such as a controller and/or host processor. Data (e.g., the operands on which the instructions will be executed) may be stored in a memory array that is accessible by the functional unit circuitry. The instructions and data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the instructions and data may also be sequenced and/or buffered.

DETAILED DESCRIPTION

Figure 1:
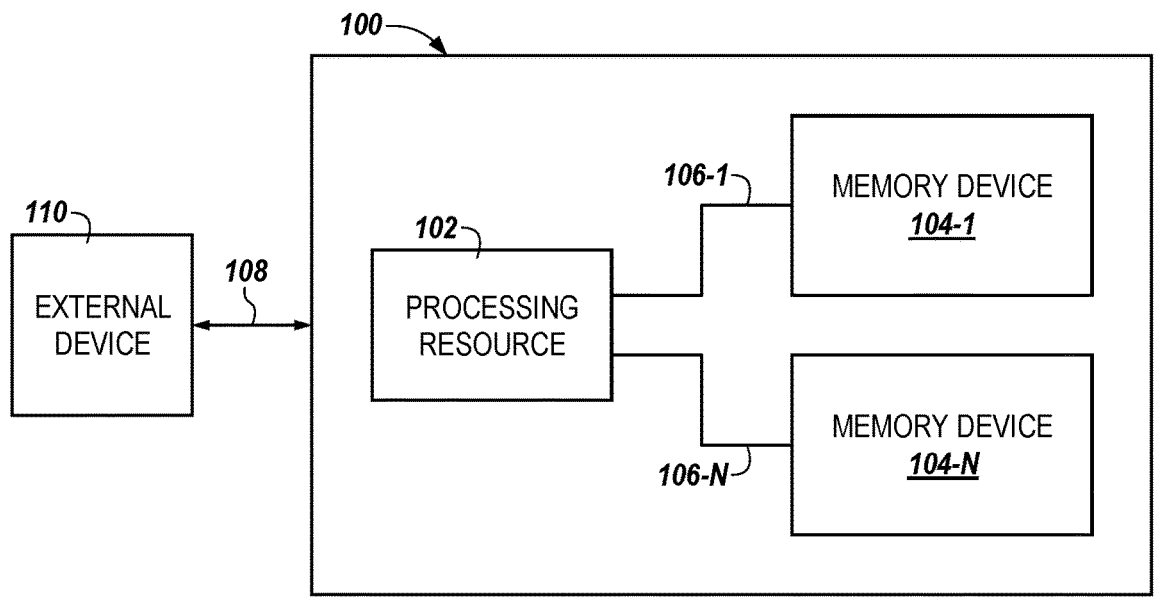
FIG. 1 is a block diagram of an apparatus 100 in accordance with a number of embodiments of the present disclosure.

The present disclosure includes apparatuses and methods related to health characteristics of a memory device. An example apparatus includes a first memory and a second memory coupled to the first memory. A controller may be coupled to the first memory and the second memory. The controller may be configured to cause the apparatus to be initialized by executing instructions on the first memory device. Initializing the apparatus may include operating the apparatus according to a set of semantics different than a set of semantics used by the second memory device. The controller may be configured to cause a determination regarding at least one health characteristic of the second memory to be made subsequent to the apparatus being initialized.

Diagnostic testing may be performed on device such as a memory device or a portion thereof, a computing system, a system-on-a-chip, or other electronic device(s). Diagnostic testing may allow for health characteristics of the device to be determined to assess reliability, maintainability, and availability of the device. Reliability may refer to the device's ability to perform a specific function and may be understood in terms of design reliability and/or operational reliability. Availability may refer to the device's ability to be kept in a functioning state, and maintainability may refer to the ease with which the device may be repaired or maintained. When diagnostic testing is being performed on the device, the device may be referred to as a device under test. For example, a device under test may be tested for reliability, maintainability, and/or availability of the device in order to provide quality control, determine one or more failures of the device, diagnose errors of the device, etc.

In some approaches to diagnostic testing, health characteristics of a device under test may be determined using automated testing equipment (ATE). As used herein, "automated testing equipment" refers to an apparatus that performs tests (e.g., diagnostic tests) on a device under test, equipment under test, or a unit under test using automation to perform measurements (e.g., perform diagnostic tests) and evaluate the results of the measurements. In some approaches, ATE may be used to determine one or more faulty components of a device under test.

As used herein, "health characteristics" refer to various parameters and/or statuses associated with a device under test that may vary over time. For example, some health characteristics, such as a number of uncorrectable errors associated with a memory device and/or a number of program/erase cycles associated with the memory device, may increase over time leading to degradation of the memory device. Some other health characteristics such as status checks of cards (e.g., memory devices, chips, or other circuitries) and/or status checks of registers (e.g., data structures storing memory addresses and/or memory locations associated with data retrieval and storage of data in a memory device) may change over time based on varying conditions and/or implementations.

However, ATE-based approaches to diagnostic testing may be costly, for example, due to the complexity of some ATE and/or ATE being constructed to perform particular diagnostic tests. In addition, ATE-based approaches to diagnostic testing may time consuming, for example, in cases where a customer has to send device to be tested to the manufacturer of the device so the manufacturer can use their ATE to perform diagnostic tests on the device. Further, ATE-based approaches to diagnostic testing may be difficult to perform on a regular basis (e.g., periodically) because the device under test must be taken to the location where the ATE is located in order for the ATE to perform diagnostic testing. Accordingly, ATE-based approaches to diagnostic testing may be difficult to scale, modularize, and/or perform quickly and efficiently.

In addition, ATE-based approaches to diagnostic testing may include removing one or more components from a device prior to performing the diagnostic testing and reinstalling the components on the device after diagnostic testing is completed. For example, in some approaches to ATE-based diagnostic testing, a memory device may be de-soldered from a circuit board that it is attached to during operation, reconditioned to establish the electrical connections, and subsequently tested using ATE.

In contrast, embodiments herein may allow for "in system diagnostic tools" to be used for diagnostic testing. As used herein, an "in system diagnostic tool" is a device or system that is capable of performing diagnostic testing in the absence of ATE. In some embodiments, an in system diagnostic tool may include a combination of hardware (e.g., one or more hardware processing resources) that may execute instructions stored in memory (e.g., one or more memory resources) to perform diagnostic testing on a device (e.g., a device under test).

In some embodiments, as described in more detail herein, an in system diagnostic tool may allow for on chip diagnostic testing of devices such as embedded multi-media controllers (eMMCs or e.MMCs), among other devices. The in system diagnostic tool may allow for a particular memory or portion of a particular memory to be tested for various health characteristics without necessitating the use of ATE. For example, the in system diagnostic tool may cause a device to initialize (e.g., to boot up) from a memory location that is different than the device under test. As a result, the in system diagnostic tool may be able to perform diagnostic testing on the device under test by executing one or more commands that provide access to the device under test that may otherwise be inaccessible, and subsequently executing one or more commands to test the device under test for various health characteristics, among other diagnostic testing.

In some embodiments, because diagnostic testing may be performed on chip, diagnostic testing may be carried out remotely (e.g., when the device under test is in the field). In addition, in some embodiments, diagnostic testing may be carried out at particular intervals (e.g., periodically) to assess health characteristics of the device under test. This may allow for potential failures of the device under test to be monitored and/or determined more quickly and more easily than in some approaches in which ATE is utilized for such diagnostic testing. In addition, this may allow for the diagnostic testing to be carried out without de-soldering the device under test, which may reduce costs, the amount of time to perform diagnostic testing, and/or alleviate the risk that the device under test is damaged during performance of the diagnostic tests.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "n, "N," etc., particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus 100 in accordance with a number of embodiments of the present disclosure. As shown in FIG. 1, the apparatus 100 includes a processing resource 102 and a plurality of memory devices 104-1/104-2 coupled to the processing resource 102 via a plurality of communication links 106-1, . . . , 106-N. The apparatus 100 may be coupleable to an external device 110 via communication link 108.

The apparatus 100 may be a computing device or portion thereof. Computing devices may include cellular phones, laptop computers, tablets, phablets, and smartphones, as well as Internet-of-Things (IoT) enabled devices, and other electronic devices. As used herein, "IoT enabled devices" include physical devices, vehicles, home appliances, and other devices embedded with electronics, software, sensors, actuators, and/or network connectivity which enables such devices to connect to a network and/or exchange data. Examples of IoT enabled devices include wearable technologies, smart home devices, intelligent shopping systems, and monitoring devices, among other cyber-physical systems. In addition, electronic devices may include one or more processing resources to execute instruction such as instruction corresponding to an operating system to provide common services for applications running on the computing system.

In some embodiments, the apparatus 100 may be provided as an automotive component or automotive testing component. For example, the apparatus 100 may be configured to control automotive components such as an in-vehicle infotainment system, an engine control component, a vehicle control component, a steering component, a braking component, a powertrain component, body control component, and/or other components utilized by a vehicle.

An in-vehicle infotainment system component may be configured to provide audio and/or video entertainment, as well as navigation, etc. to a vehicle. An engine control component may be configured to control actuators of the engine of the vehicle. For example, the engine control component may control ignition timing, air-to-fuel ratios, etc. of a vehicle. A vehicle control component may be configured to control engine and/or vehicle performance. A powertrain component may be configured to control the powertrain of the vehicle. A braking component may be configured to control and/or read data corresponding to the braking system of the vehicle, and a body control component may be configured to control body features of the vehicle such as power windows, power seats, etc.

Although several examples of vehicle control components are provided above, such examples do not limit the scope of the disclosure, and the apparatus 100 may be deployed in other scenarios in which diagnostic testing may be desirable. For example, the apparatus 100 may be deployed in a manufacturing device such as a device that manufactures various parts, widgets, and the like. Similarly, the apparatus 100 may be deployed in consumer goods such as computing devices, televisions, radios, etc.

The memory devices 104-1/104-2 may include one or more memory arrays, which can be DRAM arrays (e.g., a 3T DRAM array), SRAM arrays, STT RAM arrays, PCRAM arrays, TRAM arrays, RRAM arrays, NAND flash arrays, and/or NOR flash arrays, for instance. The arrays can comprise memory cells arranged in rows coupled by word lines and columns coupled by digit lines.

Although illustrated in FIG. 1 as two separate memory devices 104-1/104-2 may be less than, or more than, two separate memory devices 104-1/104-2. For example, the memory devices 104-1/104-2 may be a single memory device with one or more partitions, or the memory devices 104-1/104-2 may include multiple separate memory devices that may be communicatively coupled together. For example, memory device 104-1 may be one of a plurality of memory devices in apparatus 100, while memory device 104-2 may be an $N^{th}$ memory device in an apparatus containing more than two memory devices.

In at least one embodiment, the memory device 104-1 may be a random access memory (RAM) device. For example, the memory device 104-1 may be a volatile random access memory (RAM) device such as a dynamic random-access memory (DRAM) device, static random-access memory (SRAM) device, or other volatile memory devices; However, examples are not so limited, and the memory device 104-1 may be a non-volatile memory device such as a read only media (ROM), a flash memory (e.g., a solid state non-volatile computer storage media such as an electrically erasable programmable read-only memory (EE-PROM), NAND-type and/or NOR-type flash memory device such as a MEMORY CARD, USB, SDD).

In some embodiments, the memory device 104-1 may not include an "on-board" controller (e.g., a controller physically disposed on a same die as the array of memory cells included in the memory device 104-1). For example, the memory device 104-1 may include an array of memory cells, but may be controlled by an external controller (not explicitly shown in FIG. 1). In some embodiments, the memory device 104-1 may include one or more buses that may allow an external controller to access the memory device 104-1 to control operations thereof.

In some embodiments, the memory device 104-2 may be a memory device that includes both memory resources and a controller "on board," as described in more detail in connection with FIG. 2, herein. For example, the memory device 104-2 may include a controller physically disposed on the same die as the array of memory cells. In some embodiments, the memory device 104-2 may be an embedded multi-media controller (eMMC) including a flash-type memory portion and control circuitry (e.g., a controller). Other examples of memory device 104-2 may include a solid state drive (SSD) portion, a universal flash storage (UFS) portion, etc., coupled to a controller. In some embodiments, the memory device 104-2 may include one or more high access memory resources coupled to a controller and disposed on a same die (e.g., chip).

The processing resource 102, memory device 104-1, and/or memory device 104-2 may be deployed as at least a portion of an application specific integrated circuit, floating point gate array, or other integrated circuit. Embodiments are not so limited; however, and the processing resource 102, memory device 104-1, and/or memory device 104-2 may be deployed on one more die (e.g., chips) and/or may comprise one or more components.

In some approaches, the memory device 104-2 may store instructions to initialize a computing instance. The instructions may be executed to initialize the apparatus using a particular set of semantics. As used herein, a set of "semantics" is a particular set of instructions that may be executed to manage a functionality of the memory device (e.g., memory devices 104-1/104-2), processing resource 102, and/or a functionality of the apparatus 100. An example of a set of semantics is an operating system (e.g., MICROSOFT WINDOWS®, MACOS®, ANDROID®, LINUX®, UNIX®, etc.). In some embodiments, the semantics may be used to manage the functionality of the memory device and/or apparatus 100 by managing hardware and/or software resources of the apparatus 100. Managing hardware and/or software resources of the apparatus 100 may include managing functions such as input and output, memory allocation, etc.

The apparatus 100 may be coupled to an external device 110 via communication link 108. The external device 110 may be a host computing device, a universal serial bus device (USB), or other external or peripheral device. In some embodiments, the external device 110 may include hardware and instructions that may be executable to initialize the device from a memory location that is different than a memory location of the device under test. For example, the external device 110 may be configured to initialize the memory location that is different than a memory location of the device under test by disabling initialization of a set of semantics associated with an operating system of with the device under test and enabling initialization of a different set of semantics associated with a different operating system to the memory location that is different than the device under test.

In some embodiments, the external device 110 may communicate with the apparatus 100 via communication link 108. For example, the external device 110 may communicate with the apparatus 100 via communication link 108 via a local area network (LAN). In embodiments in which the external device 110 communicates with the apparatus via a LAN, the communication may be done according to a trivial file transfer protocol (tftp). In other embodiments, the external device 110 may be a universal serial bus (USB) device which may be configured to communicate with the apparatus 100 via communication link 108. In some embodiments, the external device 110 may communicate with the apparatus 100 via communication link 108 by loading an operating system image into the memory device 104-1 prior to initialization of the apparatus 100. In still other embodiments, as described in more detail in connection with FIG. 2, herein, an embedded NOR or embedded NAND device may be included in the apparatus 100 and/or coupleable to the apparatus 100, and the embedded NOR or embedded NAND device may be configured to transfer instructions and/or load an operating system image in the memory device 104-1 prior to initialization of the apparatus 100.

In some embodiments, the apparatus may be configured to initialize the apparatus 100 using instructions and/or semantics stored by the memory device 104-2. However, in contrast to some previous approaches in which the apparatus is initialized using instructions and/or semantics stored in the memory device 104-2, the apparatus may be initialized using instructions or semantics that are stored in the memory device 104-1 as opposed to instructions or semantics that are stored in the memory device 104-2. Stated differently, in some embodiments, the apparatus 100 may be configured to transfer control of initialization operations (e.g., boot operations) from the memory device 104-2 to the memory device 104-1 prior to initializing the apparatus 100.

In some embodiments, as described in more detail in connection with FIG. 2, herein, the apparatus 100 may be configured to disable (or limit) read and write access to the memory device 104-2 when the apparatus is initialized from the memory device 104-1. By disabling read and write access to the memory device 104-2 when the apparatus is initialized using instructions stored on memory device 104-1, changes in a status of the memory device 104-2 may be reduced and/or mitigated. By reducing and/or mitigating changes in status to the memory device 104-2, the memory device 104-2 may be tested more accurately than if read and write access to the memory device 104-2 remains enabled.

Figure 2:
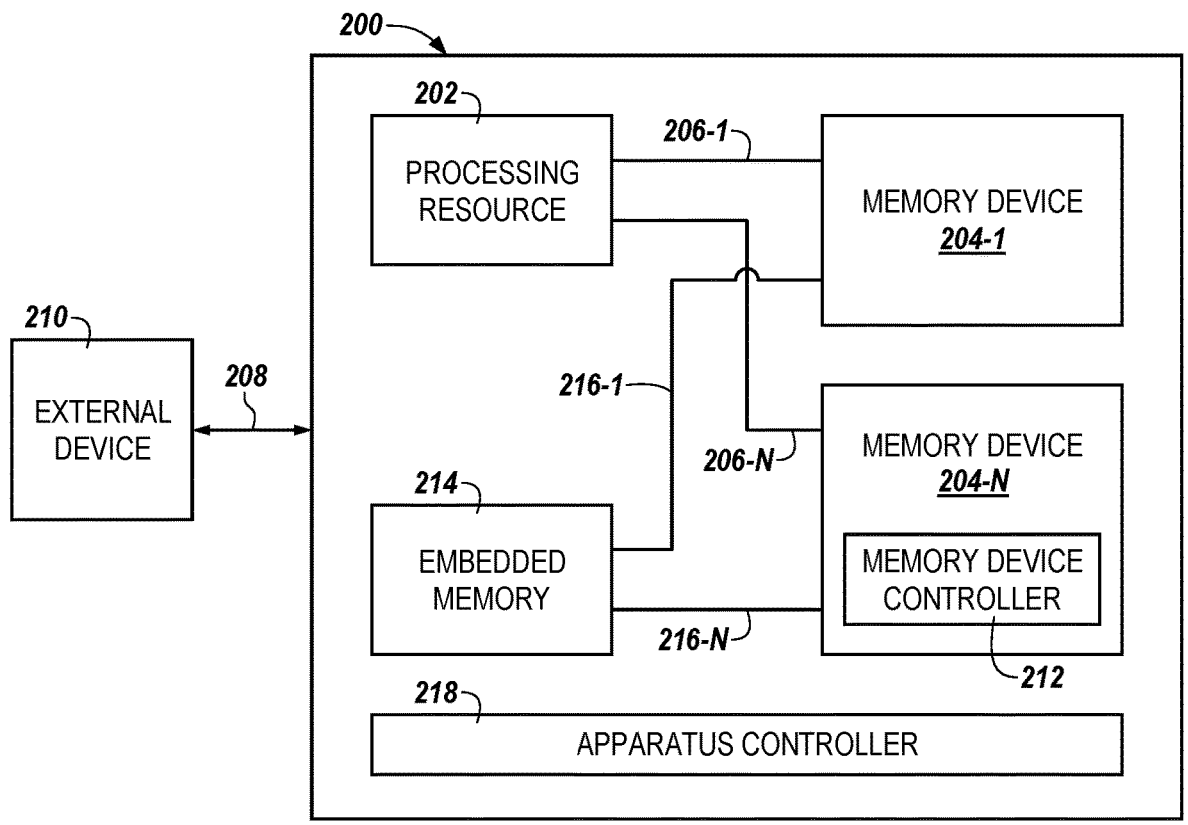
FIG. 2 is a block diagram of another apparatus 200 in accordance with a number of embodiments of the present disclosure.

FIG. 2 is a block diagram of another apparatus 200 in accordance with a number of embodiments of the present disclosure. As shown in FIG. 2, the apparatus 200 includes a processing resource 202 and a plurality of memory devices 204-1, . . . , 204-N coupled to the processing resource 202 via a plurality of communication links 206-1, . . . , 206-N. Memory device 204-N may include a memory device controller 212. The apparatus 200 may be coupleable to an external device 210 via communication link 208. In some embodiments, the apparatus 200 may further include an embedded memory 214 coupled to the memory device 204-1 and the memory device 204-N via a plurality of communication links 216-1, . . . , 216-N, and an apparatus controller 216. Although not shown in FIG. 2, the apparatus controller 216 may be coupled to the processing resource 202, the memory device(s) 204-1, . . . , 204-N, and/or the embedded memory 214.

The embedded memory 214 may be an embedded NOR-type memory, an embedded NAND-type memory, other suitable type of embedded memory such as a non-volatile flash memory device. In some embodiments, the embedded memory 214 may store instructions executable to cause the apparatus 200 to be initialized from the memory device 204-1 instead of the memory device 204-N. For example, the apparatus 200 may be configured under normal operating conditions to be initialized using semantics stored on the memory device 204-N; However, in response to execution of the instructions stored on the embedded memory 214, the apparatus 200 may be configured to be initialized from the memory device 204-1 using a set of semantics stored on the embedded memory 214. For example, the memory device 204-1 may be configured to receive instructions and/or semantics stored on the embedded memory 214 and execute the instructions and/or semantics to initialize the apparatus 200 from the memory device 204-1 as opposed to the memory device 204-N.

In some embodiments, the apparatus controller 216 and/or the memory device controller 212 may be configured to disable (or limit) read and write access to the memory device 204-N when the apparatus is initialized from the memory device 204-1. By disabling read and write access to the memory device 204-N when the apparatus is initialized using instructions stored on memory device 204-1, changes in a status of the memory device 204-N may be reduced and/or mitigated. By reducing and/or mitigating changes in status to the memory device 204-N, the memory device 204-N may be tested more accurately than if read and write access to the memory device 204-N remains enabled. For example, when the memory device 204-N is configured to be a device under test, disabling read and write access to the memory device 204-N (e.g., read or write access associated with the processing resource 202, apparatus controller 216, and/or the external device 210) may allow for more accurate diagnostic testing to be performed on the memory device 204-N to determine health characteristics of the memory device 204-N than if read and write access to the memory device 204-N remains enabled.

Figure 3:
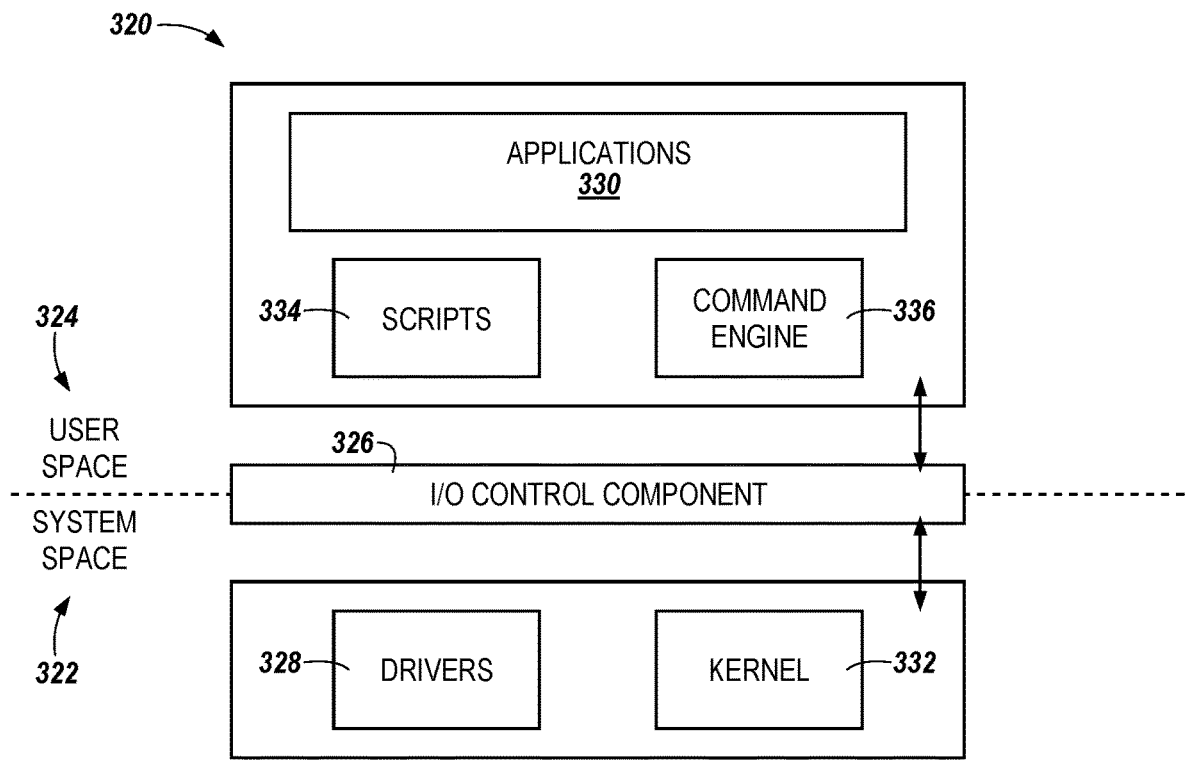
FIG. 3 illustrates a system/application level block diagram representing a portion of a computing system according to a number of embodiments of the present disclosure.

FIG. 3 illustrates a system/application level block diagram representing a portion of a computing system according to a number of embodiments of the present disclosure. The portion of the computing system 320 may represent a software stack responsible for operation of a computing system. The portion of the computing system 320 may correspond to apparatus 100 illustrated in FIG. 1 or apparatus 200 illustrated in FIG. 2, herein, or portions thereof. As shown in FIG. 3, the portion of the computing system 320 includes a system space 322 (e.g., a kernel space) and a user space 324 (e.g., "userland"). As used herein, a "system space" or "kernel space" is a memory location associated with the portion of the computing system 320 in which instructions are stored that may be executed by hardware processors associated with a computing system 320 to control the computing system. In contrast, as used herein, a "user space" is a memory location associated with the portion of the computing system 320 in which instructions corresponding to applications 330 executed by a computing system are stored. The instructions corresponding to the applications 330 may be executed by hardware processors associated with a computing system to perform a group of coordinated functions, tasks, or activities for the benefit of a user.

The system space 322 may include various drivers 328 to interface with various hardware components (e.g., processors, memory devices, peripheral devices, etc.) associated with a computing system. In some approaches, the system space 322 may be inaccessible (e.g., may not be written to, modified, etc.) by a user of the computing system. In contrast, embodiments herein may allow for access to the system space 322 via an input/output (I/O) control component 326. In some embodiments, the I/O control component may be provided as part of the kernel space 322, part of the user space 324, or combinations thereof, provided the I/O control component 326 is communicatively coupled to both the user space 324 and the kernel space 322.

The I/O control component 326 may include hardware and/or instructions and may be configured to execute the instructions and/or cause the instructions to be executed by a hardware processor that transfer one or more commands including instructions to the kernel 332 to modify one or more drivers 328 stored in the system space 322. For example, the instructions transferred to the kernel 332 may include instructions to modify or change the functionality of drivers 328 associated with control over a memory device such as memory devices 104-1/104-N illustrated in FIG. 1 or memory devices 204-1, . . . , 204-N illustrated on FIG. 2. Modifying or changing the functionality of drivers 328 associated with the memory device(s) may include modifying or changing an amount of bus resources allocated to a device of the computing system such as memory device 204-N illustrated in FIG. 2 and/or modifying or changing a timing and/or clocking frequency associated with a device of the computing system such as memory device 204-N illustrated in FIG. 2.

In some embodiments, the I/O control component 326 may be configured to transfer one or more commands to cause the kernel 332 to enter a "debug mode" prior to modifying or changing the functionality of the drivers 328 stored in the kernel space 322 and associated with the memory device. For example, the I/O control component 326 may be configured to cause the kernel 332 to enter a "debug mode" in which components associated with a physical layer (PHY) may be controlled. In some embodiments, the I/O control component 326 may be configured to enable PHY control over one or more memory devices (e.g., memory device(s) 104-1/104-2 illustrated in FIG. 1 and/or memory device(s) 204-1, . . . , 204-N illustrated in FIG. 2) to, for example, allow transfer of initialization operations from the memory device 104-2 to the memory device 104-1 as described in connection with FIGS. 1 and 2, herein. In addition, the I/O control component 326 may be configured to enable PHY control over one or more memory devices to, for example, allow diagnostic testing to be performed on the memory device 104-2/204-N, which may include determining health characteristics of the memory device.

In contrast to the system space 322 discussed above, the user space 324 may be accessible (e.g., may be written to, modified, etc.) to a user of the computing system. For example, applications 330, scripts 334, and/or instructions corresponding to the command engine 336 may be accessible to a user of the computing system. As described above, instructions corresponding to the applications 330 may be executed by hardware processors associated with the computing system to perform a group of coordinated functions, tasks, or activities for the benefit of a user.

In some embodiments, the scripts 334 may be executable to enable execution of commands related to diagnostic testing of a device such as memory device 204-N illustrated in FIG. 2, herein. The scripts 334 may include instructions to automate one or more runtime tasks of the computing system. Non-limiting examples of languages that may be used for the scripts 334 include Unix, Bash, Sudo Bash, C language, Python, Perl, ksh, csh, sh, ECMAScript, Visual Basic for Applications, Scheme, JScript, etc.

The scripts 334 may be executed by one or more processing resources (e.g., processing resource 102 illustrated in FIG. 1) to generate one or more arguments that may be utilized by commands to provide access to the memory device (e.g., memory device 204-N illustrated in FIG. 2) to perform diagnostic testing on the memory device. For example, the scripts 334 may be executed to allow vendor commands to be transferred to the memory device as part of a diagnostic test performed thereon.

In some embodiments, the commands generated by execution of the scripts 334 may include commands configured to alter a timing and/or clocking frequency associated with the memory device(s). For example, one or more commands may be generated to increase or decrease a clocking frequency of the memory device and/or alter the timing of the memory device. For a memory device that is an eMMC, in a non-limiting example, the commands generated by execution of the scripts 334 may include commands configured to alter the timing of the memory device from a HS/HS200/HS400 timing mode to a 400 kHz/1 DAT timing mode.

The command engine 336 may include hardware and/or instructions to generate and/or issue various commands to the memory device(s) and/or kernel 332. In some embodiments, the command engine 336 may be invoked by one or more of the scripts 334. For example, one or more of the scripts 334 may be executed to invoke the command engine 336. The commands generated and/or issued by the command engine 336 may include commands that allow communication between the memory device(s) and the kernel space 322. In some embodiments, the commands generated and/or issued by the command engine 336 may include native commands (e.g., eMMC native commands) transferred between the memory device(s) and the kernel space 322.

In some embodiments, the commands issued and/or generated by the command engine 336 may be provided from a data structure containing the commands such as a command list. Embodiments are not limited to commands organized in a list format; However, and the commands may be provided and/or stored in other types of data structures. In some embodiments, the commands issued and/or generated by the command engine 336 may be provided in a comma-separated value (CSV) format.

Figure 4:
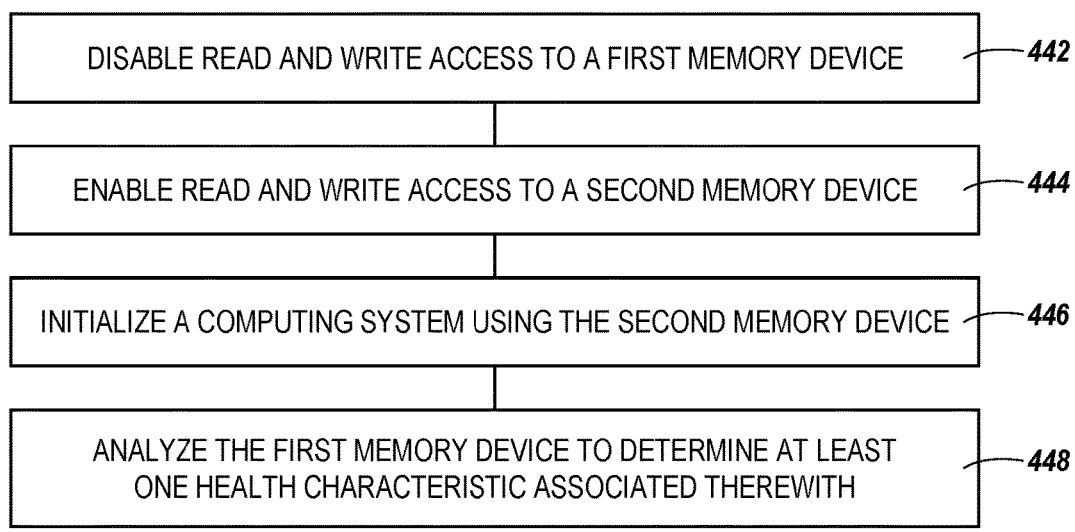
FIG. 4 illustrates a flow diagram corresponding to determining health characteristics of a memory device according to a number of embodiments of the present disclosure.

FIG. 4 illustrates a flow diagram corresponding to determining health characteristics of a memory device according to a number of embodiments of the present disclosure. At block 442, read and write access may be disabled to a first memory device. The first memory device may be analogous to memory device 104-2 described in connection with FIG. 1, herein, or memory device 204-N described in connection with FIG. 2, herein. For example, the first memory device may be an eMMC, such as the memory device 204-N described in FIG. 2, herein.

At block 444, read and write access to a second memory device may be enabled. The second memory device may be analogous to memory device 104-1/204-1 illustrated in FIGS. 1 and 2, herein. For example, the second memory device may be a random access memory device such as a DRAM.

At block 446, a computing system may be initialized using the second memory device. For example, when read and write access is disabled to the first memory device at block 442, and read and write access to the second memory device is enabled at block 444, the computing system may be configured to cause instructions to initialize the computing system to be loaded into and/or stored in the second memory device. Subsequently, the computing device may be initialized using the instructions that are loaded into and/or stored in the second memory device.

In some embodiments, enabling read and write access to the memory coupled to the first memory device may include transferring a command to enable read and write access to the memory via a local area network, a universal serial bus device, a read only memory, an operating system image, or combinations thereof.

AT block 448, the first memory device may be analyzed to determine at least one health characteristic associated therewith. As described above, the at least one health characteristics may include a card health status (e.g., a health status of the first memory device), a card register status (e.g., a status of registers of the first memory device), a number of uncorrectable errors associated with a memory device and/or a number of program/erase cycles associated with the memory device, may increase over time leading to degradation of the memory device. In some embodiments, the at least one health characteristic may be determined as part of diagnostic testing conducted on the first memory device.

As described above in connection with FIG. 3, a command path associated with the computing device may be enabled to transfer a modified driver (or modify a driver associated with the kernel space of the computing system) to provide a capability to analyze the first memory device in order to determine the at least one health characteristic of the first memory device. In some embodiments, as described above in connection with FIG. 3, a timing (or clocking frequency) of the first memory device may be adjusted by the computing system to allow diagnostic testing to be performed on the first memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a processing resource coupled to a first memory portion, a second memory portion, and a controller, wherein:
the controller is configured to cause:
control of an initialization operation to be transferred from the second memory portion to the first memory portion;
the initialization operation to be performed using memory resources associated with the first memory portion;
a plurality of diagnostic tests to be performed on the second memory portion; and
cause a modified command to be sent to a kernel space associated with an operating system deployed on the second memory portion as part of performance of the plurality of diagnostic tests.

2. The apparatus of claim 1, wherein the plurality of diagnostic tests comprise diagnostic tests to determine a plurality of health characteristics of the second memory portion.

3. The apparatus of claim 1, wherein the first portion comprises a random access memory and the second memory portion comprises an embedded multi-media controller.

4. The system of claim 1, wherein the controller is further configured to cause a timing associated with operation of the second memory portion to be altered in response to control of the initialization operation being transferred from the second memory portion to the first memory portion.

5. The system of claim 1, wherein the controller is configured to cause a trivial file transfer protocol message to be transmitted to the first memory portion to cause control of the initialization operation to be transferred from the second memory portion to the first memory portion.

6. A system, comprising:
a hardware processor;
a first memory portion and a second memory portion;
a controller coupled to the hardware processor, the first memory portion and the second memory portion, wherein the controller is configured to transmit communications between at least one of the first memory portion and the second memory portion, and wherein the controller is configured to cause:
a first command to initialize the computing system to be received by the first memory portion, the first command further comprising a command to disable initialization operations from the second memory portion;
a second command to be modified, the second command to access a portion of the computing system;
a determination regarding at least one health characteristic of the second memory portion to be made subsequent to the computing system being initialized from the first memory portion; and
the modified command to be transferred to a kernel space associated with the computing system to access a portion of the kernel space, wherein the modified command is to modify at least one driver associated with the computing system.

7. The system of claim 6, wherein the controller is configured to cause the determination regarding the at least one health characteristic to be made based, at least in part, on performance of a plurality of health characteristic diagnostic tests conducted on the second memory portion.

8. The system of claim 6, wherein the controller is further configured to control communications between a device under test (DUT) and the computing system.

9. The system of claim 6, wherein the controller is further configured to cause the first command to be received via a trivial file transfer protocol.

10. The system of claim 6, wherein the controller is further configured to cause a timing associated with the second memory to be altered in response to the computing system being initialized from the first memory portion.

11. The system of claim 6, wherein the controller is configured to initialize the computing system from the second memory portion prior to the first command being received by the first memory portion.

12. The system of claim 6, wherein the second memory portion is configured to control operation of at least one automotive component.

13. A method, comprising:
disabling read and write access to an embedded multi-media controller (eMMC);

enabling read and write access to a memory coupled to the eMMC;

initializing a computing system using the memory;

analyzing the eMMC to determine at least one health characteristic associated therewith;

modifying a command to access a portion of the initialized computing system; and transferring the modified command to the initialized computing system to alter a driver associated with the eMMC.

14. The method of claim 13, further comprising enabling a command path of the computing system to transfer a modified driver to a kernel space associated with the computing system to provide a capability to analyze the eMMC.

15. The method of claim 13, further comprising adjusting a timing associated with the eMMC prior to analyzing the eMMC to determine the at least one health characteristic associated therewith.

16. The method of claim 13, wherein the at least one health characteristic of the eMMC comprises at least one of a card check status, a card register status, a quantity of faulty blocks of memory of the second memory, a quantity of program-erase cycles associated with the second memory, a quantity of uncorrectable errors associated with the second memory, or combinations thereof.

17. The method of claim 13, wherein enabling read and write access to the memory coupled to the eMMC comprising transferring a command to enable read and write access to the memory via a local area network, a universal serial bus device, a read only memory, an operating system image, or combinations thereof.

18. The method of claim 13, wherein the modified command comprises a control bypass command and wherein altering the driver comprises executing the control bypass command to provide access to internal functionalities of the eMMC.

19. The method of claim 13, wherein the eMMC is associated with at least one automotive component.

20. An apparatus, comprising:
a processing resource coupled to a first memory portion, a second memory portion, and a controller, wherein:
the controller is configured to cause:
control of an initialization operation to be transferred from the second memory portion to the first memory portion;
the initialization operation to be performed using memory resources associated with the first memory portion;
a plurality of diagnostic tests to be performed on the second memory portion; and
a trivial file transfer protocol message to be transmitted to the first memory portion to cause control of the initialization operation to be transferred from the second memory portion to the first memory portion.

21. A system, comprising:
a hardware processor;
a first memory portion and a second memory portion;
a controller coupled to the hardware processor, the first memory portion and the second memory portion, wherein the controller is configured to transmit communications between at least one of the first memory portion and the second memory portion, and wherein the controller is configured to cause:
a first command to initialize the computing system to be received via a trivial file transfer protocol by the first memory portion, the first command further comprising a command to disable initialization operations from the second memory portion;
a second command to be modified, the second command to access a portion of the computing system; and
a determination regarding at least one health characteristic of the second memory portion to be made subsequent to the computing system being initialized from the first memory portion.

22. A system, comprising:
a hardware processor;
a first memory portion and a second memory portion;
a controller coupled to the hardware processor, the first memory portion and the second memory portion, wherein the controller is configured to transmit communications between at least one of the first memory portion and the second memory portion, and wherein the controller is configured to:
initialize the computing system from the second memory portion prior to the first command being received by the first memory portion
cause a first command to initialize the computing system to be received by the first memory portion, the first command further comprising a command to disable initialization operations from the second memory portion;
cause a second command to be modified, the second command to access a portion of the computing system; and
cause a determination regarding at least one health characteristic of the second memory portion to be made subsequent to the computing system being initialized from the first memory portion.

23. A method, comprising:
disabling read and write access to an embedded multimedia controller (eMMC);
enabling read and write access to a memory coupled to the eMMC;
initializing a computing system using the memory;
analyzing the eMMC to determine at least one health characteristic associated therewith; and
enabling a command path of the computing system to transfer a modified driver to a kernel space associated with the computing system to provide a capability to analyze the eMMC.

* * * * *